(12) United States Patent
Pan et al.

(10) Patent No.: US 12,258,274 B2
(45) Date of Patent: Mar. 25, 2025

(54) PREPARATION METHOD FOR LONG-CYCLE MODIFIED GRAPHITE-BASED COMPOSITE MATERIAL AND LITHIUM ION BATTERY COMPRISING THE MATERIAL

(71) Applicant: BTR NEW MATERIAL GROUP CO., LTD., Guangdong (CN)

(72) Inventors: Xiujun Pan, Guangdong (CN);
Dongdong Li, Guangdong (CN);
Haihui Zhou, Guangdong (CN);
Jianguo Ren, Guangdong (CN);
Youyuan Huang, Guangdong (CN);
Min Yue, Guangdong (CN)

(73) Assignee: BTR NEW MATERIAL GROUP CO., LTD., Guangdong (CN)

( * ) Notice: Subject to any disclaimer, the term of this patent is extended or adjusted under 35 U.S.C. 154(b) by 890 days.

(21) Appl. No.: 17/043,535

(22) PCT Filed: Feb. 18, 2019

(86) PCT No.: PCT/CN2019/075334
§ 371 (c)(1),
(2) Date: Sep. 29, 2020

(87) PCT Pub. No.: WO2019/237758
PCT Pub. Date: Dec. 19, 2019

(65) Prior Publication Data
US 2021/0107795 A1    Apr. 15, 2021

(30) Foreign Application Priority Data

Jun. 11, 2018  (CN) .......................... 201810594938.9

(51) Int. Cl.
*C01B 32/21*     (2017.01)
*C04B 35/52*     (2006.01)
*H01M 10/0525*   (2010.01)

(52) U.S. Cl.
CPC ............ *C01B 32/21* (2017.08); *C04B 35/522* (2013.01); *H01M 10/0525* (2013.01); *C01P 2004/32* (2013.01); *C01P 2004/61* (2013.01)

(58) Field of Classification Search
CPC ... C01B 32/21; C04B 35/522; H01M 10/0525
See application file for complete search history.

(56) References Cited

FOREIGN PATENT DOCUMENTS

| CN | 106169584 A | * | 11/2016 | ........ H01M 10/0525 |
| CN | 106252596 A | * | 12/2016 | ........ H01M 10/0525 |
| CN | 108063229 A | | 5/2018 | |
| CN | 108832091 A | | 11/2018 | |
| EP | 3726629 A1 | | 10/2020 | |
| JP | 2004253379 A | | 9/2004 | |
| KR | 20060059712 A | | 6/2006 | |

OTHER PUBLICATIONS

Extended European Search Report issued Jan. 4, 2022 in EP 19819694.1.
Japan Notice of Reasons for Refusal issued May 31, 2022 in JP 2020-563627.
International Search Report and Written Opinion in International Application No. PCT/CN2019/075334 (mailed May 22, 2019).
Korea Office Action dispatched Aug. 10, 2023 in KR 10-2020-7032535.
European Office Action dated May 29, 2024, in corresponding EP Patent Application No. 19819694.1, 7 pp.

* cited by examiner

*Primary Examiner* — Yong L Chu
(74) *Attorney, Agent, or Firm* — Leydig, Voit & Mayer, Ltd.

(57) ABSTRACT

Provided are a preparation method of a long-cycle modified graphite-based composite material and a lithium ion battery containing the material. The method including: (1) mixing a graphite material and a coating modifier; (2) placing the mixture into a self-pressurized reaction device, then placing the device in a heating apparatus to perform a self-pressurized impregnation experiment, during which temperature is controlled to increase in such a manner that the coating modifier is gradually liquefied after reaching a softening point, to completely impregnate the graphite material under self-pressurizing and to be distributed on a surface of the graphite material; (3) cooling; and (4) performing a heat treatment in an inert atmosphere to obtain the modified graphite-based composite material.

18 Claims, 1 Drawing Sheet

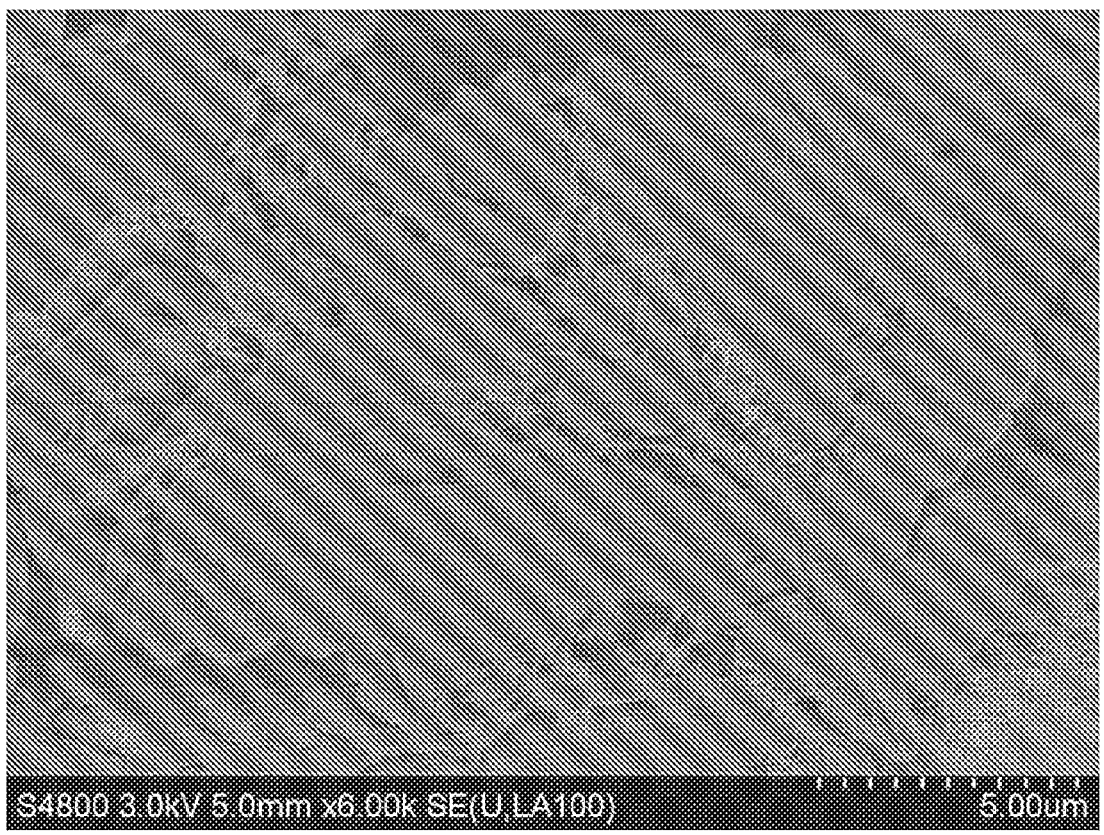

PREPARATION METHOD FOR LONG-CYCLE MODIFIED GRAPHITE-BASED COMPOSITE MATERIAL AND LITHIUM ION BATTERY COMPRISING THE MATERIAL

CROSS-REFERENCE TO RELATED APPLICATIONS

This patent application is a U.S. national phase of International Application No. PCT/CN2019/075334, filed on Feb. 18, 2019, which claims priority to Chinese Patent Application No. 201810594938.9, filed on Jun. 11, 2018. The disclosures of the aforementioned applications are hereby incorporated by reference in their entireties.

TECHNICAL FIELD

The present application relates to the technical field of anode materials of lithium-ion batteries, and relates to a long-cycle modified graphite-based composite material, a preparation method thereof, and a lithium ion battery containing the material, such as a long-cycle graphite-modified natural graphite composite anode material for lithium ion batteries, a preparation method thereof and a lithium ion battery containing the material.

BACKGROUND

Lithium ion batteries are considered to be the optimal choice of power battery for electric vehicles due to their advantages such as high energy density, long-cycle stability and no memory effect, and thus they are favored and promoted by various major electric vehicle manufacturers. With the support of government policies such as tax reduction and subsidies, electric vehicles are widely promoted. However, a real marketization thereof has not been achieved yet, mainly because of their relatively high prices. The power battery, as an important part of the electric vehicles, costs more than 30% of the price of an electric vehicle. Therefore, an important issue to be addressed in the development of power batteries is to reduce the prices thereof.

The anode material is a pivotal component of the lithium ion battery and directly determines the performance and price of the power battery. Currently, graphite is still dominant as the anode material. In terms of different sources, graphite can be classified into artificial graphite and natural graphite. The artificial graphite occupies the most of the power battery market due to its good cycle stability. However, the manufacturing process of the artificial graphite requires expensive graphitization process, and the price of raw materials is continuously rising, which leads a continuous increase, rather than a decrease, of the price of artificial graphite. In order to further lower the cost of the anode materials, natural graphite gradually attracts people' attention. The natural graphite has an important advantage of that the graphitization process is not required and the price thereof is relatively low. However, its poor cycle stability in power batteries offsets its price advantage. In view of the above, an important research focus is to improve the cycle stability of the natural graphite.

The referred natural graphite is mainly spherical natural graphite obtained by processing flake graphite. The poor cycle performance of such a material is mainly attributed to co-intercalation of organic molecules in electrolyte during the lithium intercalation process, which may lead to damage to the structure of the material. At present, the performance is improved usually with the surface coating method, with which a layer of amorphous carbon is coated on the surface of the natural graphite to isolate the electrolyte from the natural graphite.

The solid phase coating method is mainly used currently. The solid phase coating method includes: physically mixing the natural graphite with a coating modifier, and then using a liquefaction process of the coating modifier to allow flowing and self-coating of the coating modifier in a carbonization process. Such a method is easy to perform, low in cost, and thus it is widely used in the modification of natural graphite anode material. However, due to a continuous volatilization of small molecular substances of the modifier, the liquefaction process is relatively short and the duration thereof cannot be controlled. The liquid coating agent are unlikely to fully cover the external surface of the natural graphite, especially the surface of flake graphite inside the spherical graphite, such that the electrolyte will gradually permeate through the uncoated natural graphite surfaces during cycling. Thus, a solid electrolyte interface (SEI) film is formed and the electrolyte is intercalated into the layer structure of the natural graphite, continuously, which will consume a large amount of active lithium, thereby destroying the structure of the natural graphite, and resulting in continuous capacity decay. Therefore, it is necessary to develop a new natural graphite modification and coating method.

SUMMARY

The following is a summary of subject matters, which are described in detail in the present disclosure. The summary is not intended to limit the protection scope of the claims.

An object of the present application is to provide a long-cycle modified graphite-based composite material, a preparation method thereof, and a lithium ion battery containing the material. The method is easy to perform, low in production cost, and can sufficiently coat the surface of natural graphite. The method can not only completely coat the surface of natural graphite, but also can allow the coating modifier to grow and fill the interior of the graphite material. Thus, the modified natural graphite-based anode material has improved tap density, and side effects caused by electrolyte are effectively avoided, and thus the electrolyte compatibility and the cycle stability are both improved.

The term "long-cycle" of the "long-cycle modified graphite-based composite material" in the present disclosure means that, a finished battery, which adopts the modified graphite-based composite material as the anode material, has a capacity retention rate after 300 cycles at room temperature is increased by more than 90.2% compared with a finished battery using an unmodified natural graphite material as the anode material.

In order to achieve the above object, the present application provides the following technical solutions.

In a first aspect, the present application provides a method for self-pressurized impregnating and modifying the natural graphite material, and the method includes: step 1 of mixing a graphite material and a coating modifier; step 2 of placing the mixture obtained in step 1 into a self-pressurized reaction device, then placing the device in a heating apparatus to perform a self-pressurized impregnation experiment, during which temperature is controlled to increase in such a manner that the coating modifier is gradually liquefied after reaching a softening point, to sufficiently impregnate the graphite material under self-pressurizing and to be distributed on a surface of the graphite material; step 3 of cooling, during which the coating modifier distributed on the surface of the graphite material is re-cured on the surface of the graphite material; and step 4 of performing a heat treatment in an inert atmosphere to obtain the modified graphite-based composite material.

The method of the present application is simple to perform and requires low production cost. Through the combination of the self-pressurized reaction device and the heating apparatus, the coating modifier is liquefied to impregnate the graphite material under self-pressurizing. The impregnation effect is sufficient, and the liquefied coating modifier can be uniformly and completely distributed on the surface of the graphite material. After the cooling, the re-cured coating modifier is uniformly and completely coated on the surface of the graphite material. Such a complete and uniform coating effect can more effectively inhibit the side reaction between the electrode material and the electrolyte, improving the compatibility to the electrolyte, and greatly improving the cycle stability of the electrode material. Moreover, the coating modifier also enters the graphite material and fills the interspace inside the graphite material is filled with the coating modifier, which is conducive to improving the tap density of the material and improving the electrochemical performance.

As an optional technical solution of the method described in the present application, the graphite material in step 1 is spherical graphite, optionally spherical natural graphite processed from flake graphite.

Optionally, the graphite material in step 1 has an average particle size of 5 μm to 30 μm, for example, 5 μm, 6 μm, 8 μm, 10 μm, 15 μm, 17.5 μm, 20 μm, 22 μm, 25 μm, 26 μm, 28 μm, or 30 μm, etc.

Optionally, the softening point of the coating modifier in step 1 ranges from 20° C. to 300° C., for example, 20° C., 30° C., 32° C., 40° C., 45° C., 50° C., 60° C., 65° C., 80° C., 90° C., 100° C., 125° C., 150° C., 180° C., 220° C., 235° C., 270° C., or 300° C., etc. The coating modifier is selected from the group consisting of coal pitch, petroleum pitch, mesophase pitch, phenolic resin, epoxy resin, petroleum resin, coal tar, heavy oil, and combinations thereof.

Optionally, in step 1, a mass ratio of the graphite material to the coating modifier is 100:(1-100), for example, 100:1, 100:5, 100:10, 100:15, 100:18, 100:20, 100:30, 100:35, 100:40, 100:50, 100:60, 100:70, 100:80, 100:85, or 100:100, etc.; and optionally, ranges from 2 to 10.

Optionally, the mixing in step 1 is a physical mixing.

As an optional technical solution of the method described in the present application, the self-pressurized reaction device in step 2 is a high-pressure reaction kettle.

Optionally, the heating apparatus in step 2 includes a heating device such as a box furnace or an oven.

Optionally, in the self-pressurized impregnation experiment in step 2, a temperature of the heating apparatus is controlled to be higher than the softening point of the coating modifier, optionally ranging from 50° C. to 1200° C., for example, 50° C., 80° C., 120° C., 150° C., 200° C., 225° C., 300° C., 350° C., 400° C., 500° C., 550° C., 580° C., 650° C., 700° C., 750° C., 800° C., 850° C., 900° C., 1000° C., 1050° C., 1100° C. or 1200° C., etc.; and optionally ranging from 50° C. to 400° C.

Optionally, in the self-pressurized impregnation experiment in step 2, a heating rate ranges from 1° C./min to 15° C./min, for example, 1° C./min, 2° C./min, 3° C./min, 5° C./min, 7° C./min, 8° C./min, 10° C./min, 12° C./min, 13° C./min, or 15° C./min, etc.

Optionally, in the self-pressurized impregnation experiment in step 2, a holding time ranges from 0 to 300 min, for example, 0, 10 min, 20 min, 30 min, 45 min, 60 min, 90 min, 120 min, 135 min, 155 min, 180 min, 200 min, 210 min, 240 min, 260 min, 280 min, or 300 min, etc.; and optionally, 30 min to 180 min.

Optionally, in the self-pressurized impregnation experiment in step 2, the temperature and the holding time of the heating apparatus are controlled in such a manner that the pressure is in a range of 0.01 MPa to 0.05 MPa, for example, 0.01 MPa, 0.02 MPa, 0.03 MPa, 0.04 MPa, or 0.05 MPa, etc.

As an optional technical solution of the method described in the present application, the cooling in step 3 is performed using an air cooling system, a speedy liquid cooling system, or a combination thereof, in order to shorten the production cycle.

Optionally, the inert atmosphere in step 4 is selected from the group consisting of a helium atmosphere, a neon atmosphere, an argon atmosphere, a nitrogen atmosphere, a krypton atmosphere, and combinations thereof.

The heat treatment in step 4 of the present application is a high temperature treatment, and the temperature of the heat treatment ranges from 800° C. to 2200° C., for example, 800° C., 900° C., 1000° C., 1100° C., 1200° C., 1300° C., 1400° C., 1500° C., 1600° C., 1750° C., 1850° C., 2000° C., 2100° C., or 2200° C., etc.

Optionally, the heat treatment in step 4 is performed for 1 h to 10 h, for example, 1 h, 2 h, 3 h, 4 h, 5 h, 6.5 h, 7 h, 8 h, 9 h, or 10 h, etc.

As an optional technical solution of the method described in the present application, the method includes: step 1' of physically mixing the graphite material and the coating modifier according to a mass ratio of 100:(1-100); step 2' of placing the mixture obtained in step 1' into the self-pressurized reaction device, then placing the device in the heating apparatus to perform a self-pressurized impregnation experiment, during which the temperature is controlled to rise with a heating rate of 1° C./min to 15° C./min in a range of 50° C. to 1200° C. in such a manner that the coating modifier is gradually liquefied after reaching the softening point, to completely impregnate the graphite material under the self-pressurizing and to be distributed on the surface of the graphite material; step 3' of cooling with an air cooling system or a speedy liquid cooling system, during which the coating modifier uniformly distributed on the surface of the graphite material is re-cured on the surface of the graphite material; and step 4' of performing the heat treatment at 800° C. to 2200° C. for 1 h to 10 h in the inert atmosphere to obtain the modified graphite-based composite material. The softening point of the coating modifier ranges from 20° C. and 300° C., and the coating modifier is selected from the group consisting of coal pitch, petroleum pitch, mesophase pitch, phenolic resin, epoxy resin, petroleum resin, coal tar, heavy oil, and combinations thereof.

In a second aspect, the present application provides an anode material, and the anode material is the modified graphite-based composite material prepared by the method described in the first aspect. In the anode material, the coating modifier is completely cured and coats the surface of the graphite material, and also enters the graphite material. Therefore, the surface is completely isolated from the electrolyte, avoiding the side effects caused by the electrolyte. In this way, the compatibility to the electrolyte is improved, and the cycle stability is significantly enhanced. By filling the interspace inside the graphite material with the coating modifiers, the tap density of the material is increased and the electrochemical performance is improved.

In a third aspect, the present application provides a lithium ion battery including the anode material described in the second aspect.

Compared with the related art, the present application has the following beneficial effects.

(1) In the present application, the self-pressurized reaction device is used in conjunction with the heating apparatus to liquefy the coating modifier and completely impregnate the graphite material under the self-pressurizing. After being heated, the liquefied coating modifier can be uniformly and completely distributed on the surface of the graphite material, and then through the cooling, the re-cured coating modifier is uniformly and completely coated on the surface of the graphite material.

In the modified graphite-based composite material of the present application, the coating modifier is completely and uniformly coated on the surface of the graphite material, so as to effectively inhibit the side reaction between the electrode material and the electrolyte, thereby improving the compatibility to the electrolyte. Therefore, the cycle stability of the electrode materials is greatly improved, and the capacity retention rate after 300 cycles at room temperature is increased by more than 8%. Moreover, the coating modifier also enters the graphite material, and fills the interspace inside the graphite material, thereby increasing the tap density of the material and improving the electrochemical performance.

(2) The method of the present application is easy to perform, requires low production cost, and is also suitable for industrial production.

Other aspects will be clear upon reading and understanding the detailed description with reference to accompanying drawings.

BRIEF DESCRIPTION OF DRAWINGS

FIG. 1 is a scanning electron microscope test image of a cross-section of a modified graphite-based composite anode material in Example 1 of the present application.

DESCRIPTION OF EMBODIMENTS

The technical solutions of the present application will be further described below with reference to specific implementation manners in conjunction with the drawings.

Those skilled in the art can understand that the present application may have various other modifications and changes.

The methods in the following examples are conventional, unless otherwise specified. The experimental materials were those directly purchased from biochemical reagent companies without any further purification, unless otherwise specified.

The anode materials of Examples 1 to 8 and Comparative Example 1 were tested by the following methods:

A laser particle size analyzer MS 2000 (Malvern) was used to measure a range of particle size of the materials and an average particle size of the raw material particles.

Scanning electron microscope S4800 (Hitachi) was used to observe surface morphology, particle size and the like of the samples.

A battery test system (manufactured by Neware Electronics Co., Ltd., Shenzhen, China) was used to measure a specific capacity, the first efficiency and the cycle performance of anode materials. The specific test conditions are referred to the section of electrochemical test (see Examples).

The tap density was measured using a tap density meter (manufactured by Quantachrome Instruments, USA), with a number of vibrations of 1000 times.

Example 1

Natural graphite (with an average particle size of 15 μm) and epoxy resin were mechanically and physically mixed in a ratio of 1:0.3, then the mixture was placed in a self-pressurized device, and the self-pressurized device was placed in a box furnace for self-pressurized impregnation, during which the heating rate of the box furnace was 10° C./min, the holding temperature was 200° C., and the holding time was 3 hours. Then, a speedy liquid cooling system was used for cooling. The treated sample was heat-treated at 1200° C. in the argon atmosphere. The specially treated sample was crushed and classified to obtain a modified graphite-based composite material, which was an anode material with excellent performance.

Test of Electrochemical Performance:

The coated modified natural graphite obtained in Example 1 was used as the anode active material, uniformly mixed with CMC and SBR in a mass ratio of 96.5:1.5:2 (active material: CMC: SBR), then the mixture was coated onto a copper foil current collector, and dried to obtain an anode plate for use.

First, a button battery test was performed on the obtained electrode plate. The battery was assembled in an argon glove box. A lithium metal plate was used as the anode. The electrolyte was 1 mol/L of a mixture of $LiPF_6$, ethylene carbonate and ethyl methyl carbonate ($LiPF_6$+EC+EMC). A polyethylene/propylene composite microporous membrane was used as separator. The electrochemical performance was measured with a battery testing instrument. A charging and discharging voltage was 0.01V to 1.5V, and a charging and discharging rate was 0.1 C, and the measured first capacity and efficiency were listed in Table 1.

Test of assembled battery: the natural graphite-based composite material obtained in Example 1, a conductive agent, carboxymethyl cellulose (CMC) and styrene-butadiene rubber (SBR) were mixed in a mass ratio of 95:1.5:1.5:2, and then the mixture was coated onto a copper foil to obtain an anode plate. A cathode active material $LiCoO_2$, a conductive agent, and polyvinylidene fluoride (PVDF) were mixed uniformly in a mass ratio of 96.5:2:1.5, and then the mixture was coated on an aluminum foil to obtain a cathode plate. The electrolyte was 1 mol/L of $LiPF_6$+EC+EMC, and the separator was a polyethylene/propylene composite microporous membrane. The battery was charged and discharged at room temperature with a rate of 1 C in a voltage range of 3.0V to 4.2V. The cycle performance obtained in the test is shown in Table 1.

FIG. 1 is a scanning electron microscope test image of a cross-section of the modified graphite-based composite anode material in Example 1 of the present application. In view of FIG. 1, it is obvious that the surface spherical natural graphite is completely coated through the self-pressurized impregnation modification method, and additionally, the resin and asphalt internally filled the interspace inside the spherical graphite, which is beneficial to increasing the tap density of the material.

Example 2

Natural graphite (with an average particle size of 10 μm) and high-temperature coal pitch (with a softening point of 170° C.) were mechanically and physically mixed in a ratio of 1:0.2, then the mixture was placed into a self-pressurized device, and the self-pressurized device was placed in a box furnace for self-pressurized impregnation, during which a heating rate of the box furnace was 10° C./min, a holding temperature was 250° C., and a holding time was 1 hour. Then, a speedy liquid cooling system was used for cooling. The treated sample was heat-treated at 950° C. in an argon atmosphere. The specially treated sample was crushed and classified to obtain an anode material.

The same methods as in Example 1 were used to prepare an anode, to assemble a button cell and a full cell, and to perform performance tests. The obtained half-cell capacity, first efficiency, and full-cell cycle performance are listed in Table 1.

Example 3

Natural graphite (with average particle size of 10 μm) and petroleum pitch (with a softening point of 120° C.) were mechanically and physically mixed in a ratio of 1:0.8, then the mixture was placed in a self-pressurized device, and the self-pressurized device was placed into a box furnace for self-pressurized impregnation, during which a heating rate of the box furnace was 5° C./min, a holding temperature was 180° C., and a holding time was 1.5 hours. Then, a speedy liquid cooling system was used for cooling. The treated sample was heat-treated at 1150° C. in an argon atmosphere. The specially treated sample was crushed and classified to obtain an anode material.

The same methods as in Example 1 were used to prepare an anode, to assemble a button cell and a full cell, and to perform performance tests. The obtained half-cell capacity, first efficiency, and full-cell cycle performance are listed in Table 1.

Example 4

Natural graphite (with an average particle size of 20 μm) and petroleum pitch (with a softening point of 120° C.) were mechanically and physically mixed in a ratio of 1:0.2, then the mixture was placed in a self-pressurized device, the self-pressurized device was placed in a box furnace for self-pressurized impregnation, during which a heating rate of the box furnace was 10° C./min, a holding temperature was 220° C., and a holding time was 2 hours. Then, a speedy liquid cooling system was used for cooling. The treated sample was heat-treated at 1200° C. in an argon atmosphere. The specially treated sample was crushed and classified to obtain an anode material.

The same methods as in Example 1 were used to prepare an anode, to assemble a button cell and a full cell, and to perform performance tests. The obtained half-cell capacity, first efficiency, and full-cell cycle performance are listed in Table 1.

Example 5

Natural graphite (with an average particle diameter of 20 μm) and phenolic resin were mechanically and physically mixed in a ratio of 1:0.3, then the mixture was placed in a self-pressurized device, and the self-pressurized box was placed in a box furnace for self-pressurized impregnation, during which a heating rate of the box furnace was 1° C./min, a holding temperature was 180° C., and a holding time was 2 hours. Then, a speedy liquid cooling system was used for cooling. The treated sample was heat-treated at 1100° C. in an argon atmosphere. The specially treated sample was crushed and classified to obtain an anode material.

The same methods as in Example 1 were used to prepare an anode, to assemble a button cell and a full cell, and to perform performance tests. The obtained half-cell capacity, first efficiency, and full-cell cycle performance are listed in Table 1.

Example 6

Natural graphite (with an average particle size of 15 μm) and a coating modifier (phenolic resin: petroleum pitch=1:1) were mechanically and physically mixed in a ratio of 1:0.2, then the mixture was placed into a self-pressurized device, the self-pressurized device was placed in a box furnace for self-pressurized impregnation, during which a heating rate of the box furnace was 5° C./min, a holding temperature was 200° C., and a holding time is 3 hours. Then, a speedy liquid cooling was used for cooling. The treated sample was heat-treated at 1100° C. in an argon atmosphere. The specially treated sample was crushed and classified to obtain an anode material.

The same methods as in Example 1 were used to prepare an anode, to assemble a button cell and a full cell, and to perform performance tests. The obtained half-cell capacity, first efficiency, and full-cell cycle performance are listed in Table 1.

Example 7

Natural graphite (with average particle size of 17 μm) and a coating modifier (epoxy resin: petroleum pitch=1:1) were mechanically and physically mixed in a ratio of 1:0.2, then the mixture was placed into self-pressurized device, and the self-pressurized device was placed in a box furnace for self-pressurized impregnation, during which a heating rate of the box furnace was 2° C./min, a holding temperature was 200° C., and a holding time was 2 hours. Then, a liquid speed coiling system was used for cooling. The treated sample was heat-treated at 2000° C. under a nitrogen atmosphere. The specially treated sample was crushed and classified to obtain an anode material.

The same methods as in Example 1 were used to prepare an anode, to assemble a button cell and a full cell, and to perform performance tests. The obtained half-cell capacity, first efficiency, and full-cell cycle performance are listed in Table 1.

Example 8

Natural graphite (with an average particle size of 17 μm) and a coating modifier (coal pitch: petroleum pitch=1:1) were mechanically and physically mixed in a ratio of 1:0.4, then the mixture was placed into a self-pressurized device, and the self-pressurized device was placed in a box furnace for self-pressurized impregnation, during which a heating rate of the box furnace was 1° C./min, a holding temperature is 240° C., and a holding time was 3 hours. Then, a liquid speed coiling system was used for cooling. The treated sample was heat-treated at 2200° C. under a nitrogen atmosphere. The specially treated sample was crushed and classified to obtain an anode material.

The same methods as in Example 1 were used to prepare an anode, to assemble a button cell and a full cell, and to perform performance tests. The obtained half-cell capacity, first efficiency, and full-cell cycle performance are listed in Table 1.

Comparative Example 1

As raw material, spherical natural graphite with an average particle size of about 15 μm was used for preparing a natural graphite-based composite material.

The same methods as in Example 1 were used to prepare an anode, to assemble a button cell and a full cell, and to perform performance tests. The obtained half-cell capacity, first efficiency, and full-cell cycle performance are listed in Table 1.

TABLE 1

| Sample | Capacity of first Li-deintercalation | First efficiency | Capacitance retention rate after 300 cycles at room temperature (%) | Tap density |
|---|---|---|---|---|
| Example 1 | 361.4 | 94.7 | 92.2 | 1.08 |
| Example 2 | 362.2 | 93.1 | 92.3 | 0.95 |
| Example 3 | 361.1 | 95.0 | 92.0 | 0.96 |
| Example 4 | 363.5 | 94.8 | 92.4 | 1.08 |
| Example 5 | 360.2 | 94.9 | 92.5 | 1.06 |
| Example 6 | 362.1 | 95.1 | 90.2 | 1.07 |
| Example 7 | 361.2 | 94.6 | 90.8 | 1.08 |
| Example 8 | 359.3 | 94.5 | 91.5 | 1.10 |
| Comparative Example 1 | 367.2 | 92.1 | 83.9 | 0.91 |

Comparing the capacities of first Li-deintercalation in Examples 1-8 and Comparative Example 1 in Table 1, it is obvious that, by coating the coating modifier with the method of the present application, a gram capacity of the material was reduced, which may be mainly attributed to the low capacity of hard or soft carbon introduced during the coating process; and the first efficiency was increased, which may be mainly attributed to the improved surface of the material after the coating. In the room temperature cycle test of the button cells and full cells, in view of the capacity retention rates after 300 cycles listed in Table 1, it can be seen that cycle performance of the materials after the coating modification was significantly improved, and the capacity retention rate after 300 cycles was increased to at least 90.2%.

The above-mentioned embodiments are described to explain the detailed method of the present application, but are not intended to limit the present application. That is, the present application can be implemented not merely depending upon the above-mentioned detailed method. Those skilled in the art understand that any improvements to the present application, equivalent replacements of raw materials of the product of the present application, additions of auxiliary components, selections of specific methods, etc., shall fall within the protection scope and the disclosure of the present application.

What is claimed is:

1. A method for preparing a long-cycle modified graphite-based composite material, the method comprising:
step 1 of mixing a graphite material and a coating modifier in a mass ratio of 100: (1-35);
step 2 of placing a mixture obtained in step 1 into a self-pressurized reaction device, then placing the device in a heating apparatus to perform a self-pressurized impregnation experiment, during which temperature is controlled to increase in such a manner that the coating modifier is gradually liquefied after reaching a softening point, to completely impregnate the graphite material under self-pressurizing and to be distributed on a surface of the graphite material, wherein a pressure in the self-pressurized reaction device increases automatically without controlling valves to charge gas or discharge gas;
step 3 of cooling, during which the coating modifier distributed on the surface of the graphite material is re-cured on the surface of the graphite material; and
step 4 of performing a heat treatment in an inert atmosphere to obtain the modified graphite-based composite material.

2. The method according to claim 1, wherein the graphite material in step 1 is spherical graphite.

3. The method according to claim 1, wherein the graphite material in step 1 is spherical natural graphite processed from flake graphite.

4. The method according to claim 1, wherein the graphite material in step 1 has an average particle size ranging from 5 μm to 30 μm.

5. The method according to claim 1, wherein the softening point of the coating modifier in step 1 ranges from 20° C. to 300° C., and the coating modifier is selected from the group consisting of coal pitch, petroleum pitch, mesophase pitch, phenolic resin, epoxy resin, petroleum resin, coal tar, heavy oil, and combinations thereof.

6. The method according to claim 1, wherein the mixing in step 1 is a physical mixing.

7. The method according to claim 1, wherein the self-pressurized reaction device in step 2 is a high-pressure reaction kettle.

8. The method according to claim 1, wherein the heating apparatus in step 2 comprises any one of a box furnace or an oven.

9. The method according to claim 1, wherein in the self-pressurized impregnation experiment in step 2, a temperature of the heating apparatus is controlled to be higher than the softening point of the coating modifier.

10. The method according to claim 1, wherein in the self-pressurized impregnation experiment in step 2, a temperature of the heating apparatus is controlled to be 50° C. to 1200° C.

11. The method according to claim 9, wherein in the self-pressurized impregnation experiment in step 2, a heating rate ranges from 1° C./min to 15° C./min.

12. The method according to claim 9, wherein in the self-pressurized impregnation experiment in step 2, a holding time ranges from 0 to 300 min.

13. The method according to claim 1, wherein the cooling in step 3 is performed using an air cooling system, a speedy liquid cooling system, or a combination thereof.

14. The method according to claim 1, wherein the inert atmosphere in step 4 is selected from the group consisting of a helium atmosphere, a neon atmosphere, an argon atmosphere, a nitrogen atmosphere, a krypton atmosphere, and combinations thereof.

15. The method according to claim 1, wherein the heat treatment in step 4 is performed at a temperature of 800° C. to 2200° C., the heat treatment in step 4 is performed for 1 hour to 10 hours.

16. The method according to claim 1, comprising:
step 1' of physically mixing the graphite material and the coating modifier according to a mass ratio of 100: (1-100);
step 2' of placing a mixture obtained in step 1' into the self-pressurized reaction device, then placing the device in the heating apparatus to perform a self-pressurized impregnation experiment, during which the temperature is controlled to rise at a heating rate of 1° C./min to 15° C./min in a range of 50° C. to 1200° C. in such a manner that the coating modifier is gradually liquefied after reaching the softening point, to completely impregnate the graphite material under the self-pressurizing and to be distributed on the surface of the graphite material;

step 3' of cooling with an air cooling system or a speedy liquid cooling system, during which the coating modifier uniformly distributed on the surface of the graphite material is re-cured on the surface of the graphite material; and step 4' of performing the heat treatment at 800° C. to 2200° C. for 1 hour to 10 hours in the inert atmosphere to obtain the modified graphite-based composite material, wherein the softening point of the coating modifier ranges from 20° C. to 300° C., and the coating modifier is selected from the group consisting of coal pitch, petroleum pitch, mesophase pitch, phenolic resin, epoxy resin, petroleum resin, coal tar, heavy oil, and combinations thereof.

17. An anode material, wherein the anode material is the modified graphite-based composite material prepared by the method according to claim 1.

18. A lithium ion battery, comprising the anode material according to claim 17.

* * * * *